United States Patent
Kim et al.

(10) Patent No.: US 9,736,398 B2
(45) Date of Patent: Aug. 15, 2017

(54) X-RAY DETECTING METHOD, PHOTOGRAPHING METHOD USING THE X-RAY DETECTING METHOD, AND X-RAY DETECTOR USING THE METHODS

(71) Applicant: Samsung Electronics Co., Ltd., Suwon-si, Gyeonggi-do (KR)

(72) Inventors: Young Kim, Yongin-si (KR); Yongchul Kim, Seoul (KR); Jaechul Park, Yangju-si (KR); Kangho Lee, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 64 days.

(21) Appl. No.: 14/685,006

(22) Filed: Apr. 13, 2015

(65) Prior Publication Data

US 2015/0326802 A1 Nov. 12, 2015

(30) Foreign Application Priority Data

May 12, 2014 (KR) ........................ 10-2014-0056572

(51) Int. Cl.
| | | |
|---|---|---|
| G01J 1/42 | (2006.01) | |
| H04N 5/32 | (2006.01) | |
| H04N 5/359 | (2011.01) | |
| G01T 1/16 | (2006.01) | |
| H04N 5/378 | (2011.01) | |
| G01T 1/17 | (2006.01) | |

(52) U.S. Cl.
CPC ............... *H04N 5/32* (2013.01); *G01T 1/16* (2013.01); *G01T 1/17* (2013.01); *H04N 5/359* (2013.01); *H04N 5/378* (2013.01)

(58) Field of Classification Search
CPC .......... H04N 5/32; H04N 5/359; H04N 5/378; H04N 5/365; H04N 5/3653; G01T 1/16; G01T 1/17; G01T 1/201
USPC ........................................................ 250/394
See application file for complete search history.

(56) References Cited

U.S. PATENT DOCUMENTS

| | | | |
|---|---|---|---|
| 4,996,413 A * | 2/1991 | McDaniel | ............ H04N 3/1506 250/208.1 |
| 6,849,853 B2 | 2/2005 | Ikeda et al. | |
| 8,415,636 B2 | 4/2013 | Sato | |
| 2013/0108015 A1 | 5/2013 | Kottler et al. | |

FOREIGN PATENT DOCUMENTS

| | | |
|---|---|---|
| KR | 20100027808 A | 3/2010 |
| KR | 10-1222224 B1 | 1/2013 |

* cited by examiner

*Primary Examiner* — David Porta
*Assistant Examiner* — Meenakshi Sahu

(57) ABSTRACT

Provided are methods of detecting X-rays, a photographing methods using the X-ray detecting method and/or an X-ray detector using the methods. For example, one method of detecting X-rays includes radiating a first X-ray, removing, by a first X-ray detection unit, a first electric charge generated by the radiated first X-ray, and outputting, by a second X-ray detection unit adjacent to the first X-ray detection unit, a voltage corresponding to the first X-ray.

20 Claims, 10 Drawing Sheets

X-RAY DETECTING METHOD, PHOTOGRAPHING METHOD USING THE X-RAY DETECTING METHOD, AND X-RAY DETECTOR USING THE METHODS

CROSS REFERENCE TO RELATED APPLICATIONS

This application claims priority under 35 U.S.C. §119 to Korean Patent Application No. 10-2014-0056572, filed on May 12, 2014, in the Korean Intellectual Property Office, the disclosure of which is incorporated herein in its entirety by reference.

BACKGROUND

1. Field

Example embodiments relate to a method of detecting X-rays, a photographing method using the detected X-ray an X-ray detector using the methods, and/or system using the method.

2. Description of the Related Art

X-rays are being used for various non-destructive examinations, for example, examinations of structures of materials and/or material properties, visual diagnoses, and security searches in a variety of industrial fields as well as in science and/or medicinal fields. Generally, an image system using X-rays includes, for example, an X-ray generator which generates X-rays and an X-ray detector which detects X-rays passing through an object.

The X-ray generator generally generates X-rays by making an electron discharged from a cathode collide with an anode. Types of the electron discharging devices employed in X-ray generators can be divided into a cold cathode type and a hot cathode type. Further, among the electron discharging devices, field emission type devices are known to be driven at a lower voltage than other types of electron discharging devices. Accordingly, many research activities are being carried out to commercialize the field emission type devices.

In particular, an array-type X-ray generator combining a plurality of field emission type devices has been developed. However, this array-type X-ray generator may have overdose or interference problems.

SUMMARY

At least one example embodiment provides a method of detecting X-rays, which is capable of reducing overdose or interference of X-rays, and an X-ray photographing method using the same.

At least one example embodiment provides an X-ray detector capable of reducing overdose or interference of X-rays and an apparatus for detecting X-rays using the X-ray detector.

Additional aspects will be set forth in part in the description which follows and, in part, will be apparent from the description, or may be learned by practice of the presented example embodiments.

According to an example embodiment, a method for detecting X-rays may include radiating a first X-ray, removing, by a first X-ray detection unit, a first electric charge generated by the incident first X-ray, and outputting, by a second X-ray detection unit adjacent to the first X-ray detection unit, a voltage corresponding to the first X-ray.

The outputting may include generating a second electric charge by the incident first X-ray and outputting the voltage corresponding to the second electric charge.

The removing may include discharging the first electric charge.

The removing may be performed while radiating the first X-ray.

The method may further include radiating a second X-ray, removing, by the second X-ray detection unit, a third electric charge generated by the incident second X-ray, and outputting, by the first X-ray detection unit, a voltage corresponding to the second X-ray.

The second X-ray detection unit may respond to the first X-ray radiated by an X-ray source.

According to an example embodiment, an X-ray photographing method may include radiating, by an X-ray source, X-rays, outputting, by an X-ray detection unit corresponding to the X-ray source, a voltage corresponding to the X-rays incident on the X-ray detection unit corresponding to the X-ray source, stopping the radiation of X-rays from the X-ray source, and removing, by the X-ray detection unit, a generated first electric charge.

The first electric charge may be generated by X-ray incident on at least one X-ray detection units other than X-ray detection units corresponding to at least one X-ray source radiating the X-rays.

The outputting may include generating a second electric charge corresponding to the incident X-rays, and outputting the voltage corresponding to the second electric charge.

The removing may include discharging the first electric charge.

According to an example embodiment, an X-ray detector may include a first electric charge generation unit configured to generate an electric charge in response to incident X-rays, and a first effective charge sensitive amplifier configured to output a voltage corresponding to the electric charge or remove the electric charge.

The first effective charge sensitive amplifier may be configured to output the voltage corresponding to the electric charge when an X-ray source corresponding to the first electric charge generation unit radiates the X-rays, and may be configured to remove the electric charge when the X-ray source stops the radiation of the X-rays.

The first effective charge sensitive amplifier may include a charge sensitive amplifier configured to output the voltage corresponding to the electric charge, and a first switching unit, one end of which being connected to an input terminal of the charge sensitive amplifier and the other end of which being connected to the output terminal of the charge sensitive amplifier.

When the first switching unit is turned off, the first effective charge sensitive amplifier may be configured to output the voltage corresponding to the applied electric charge, and when the first switching unit is turned on, the first effective charge sensitive amplifier may be configured to remove the electric charge.

The first effective charge sensitive amplifier configured to remove the electric charge may include an effective charge sensitive amplifier configured to discharge the electric charge.

The X-ray detector may further include a second electric charge generation unit adjacent to the first electric charge generation unit and configured to generate an electric charge in response to incident X-rays, a first transistor configured to apply the electric charge generated in the first electric charge generation unit to the first effective charge sensitive amplifier, and a second transistor configured to apply the electric charge generated in the second electric charge generation unit to the first effective charge sensitive amplifier.

When any one of the first and second transistors is turned on, the other may be configured to be turned off.

When the X-ray source corresponding to the first electric charge generation unit radiates the X-rays and the first transistor is turned on, the first effective charge sensitive amplifier may be configured to output a voltage corresponding to the electric charge provided from the first electric charge generation unit, and when the X-ray source corresponding to the first electric charge generation unit radiates the X-rays and the second transistor is turned on, the first effective charge sensitive amplifier may be configured to remove the electric charge provided from the second electric charge generation unit.

The X-ray detector may further include a second effective charge sensitive amplifier configured to output a voltage corresponding to the electric charge or remove the electric charge, wherein the second transistor is configured to apply the electric charge to the second effective charge sensitive amplifier.

When the second effective charge sensitive amplifier is in an operation mode, the first effective charge sensitive amplifier may be configured to be in a reset mode.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
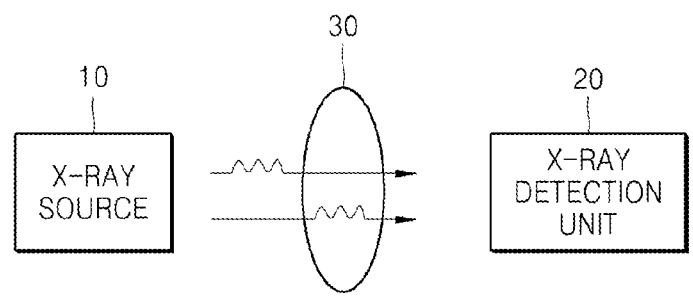
FIG. 1 is a diagram of a unit photographing block of an X-ray photographing apparatus according to an example embodiment of the present invention.

Various example embodiments will be described more fully hereinafter with reference to the accompanying drawings, in which some example embodiments are shown. Like reference numerals refer to like elements throughout. In this regard, the presented example embodiments may have different forms and should not be construed as being limited to the descriptions set forth herein. Accordingly, the presented example embodiments are merely described below, by referring to the figures, to explain aspects of example embodiments. In the drawings, the thicknesses of layers and regions may be exaggerated for clarity.

The term such as " . . . unit" in this description indicates a unit processing at least one function or performing at least one operation and may be implemented by hardware or software or a combination of hardware and software.

While such terms as "first," "second," etc., may be used to describe various components, such components must not be limited to the above terms. The above terms are used only to distinguish one component from another.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this description, an "object" may include a human-being or an animal or a part of a human-being or an animal. For example, the object may include organs, for example, a liver, a heart, a uterus, a brain, a breast, an abdomen, blood vessels.

Also, in this description, a "user" is a health specialist, for example, a doctor, a nurse, a medical technologist, a medical image specialist, or a technician repairing medical apparatuses, but is not limited thereto.

Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, some example embodiments will be explained in further detail with reference to the accompanying drawings.

Figure 2:
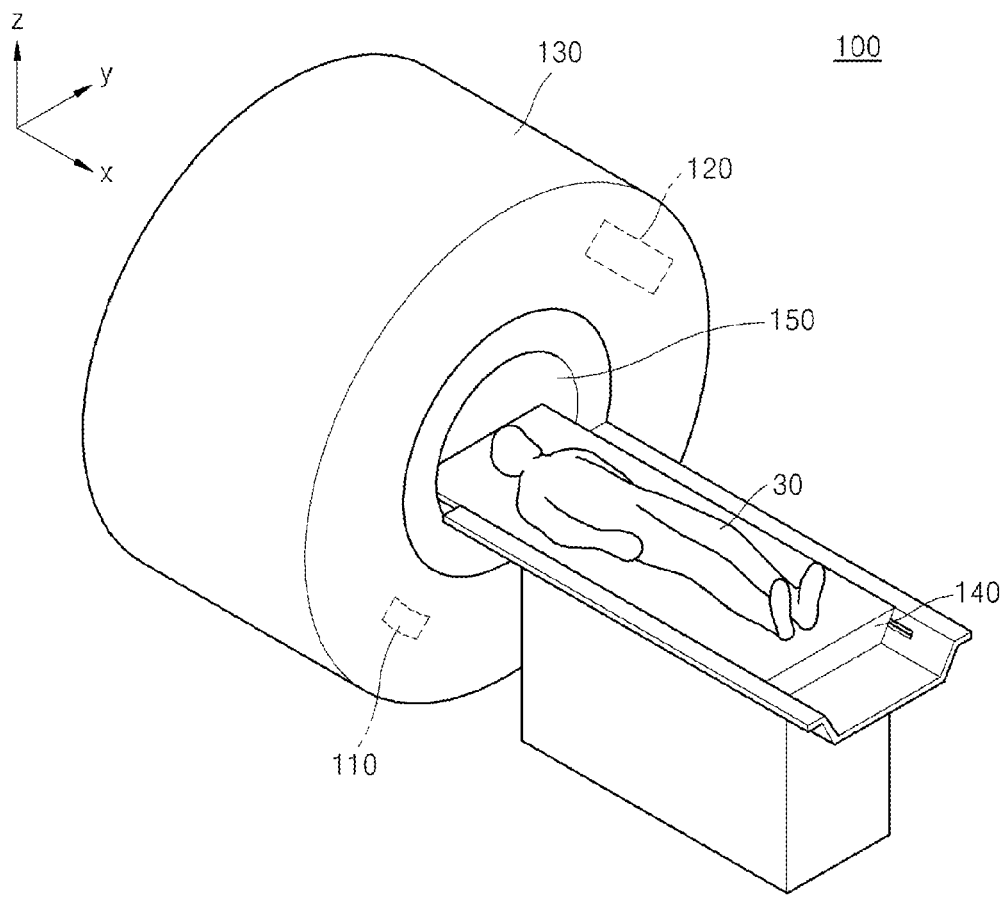
FIG. 2 shows a partial external perspective view of an X-ray photographing apparatus according to an example embodiment of the present invention.

FIG. 1 is a diagram of a unit photographing block of an X-ray photographing apparatus according to an example embodiment of the present invention, and FIG. 2 shows a partial external perspective view of an X-ray photographing apparatus according to an example embodiment of the present invention. As shown in FIGS. 1 and 2, an X-ray source 10 which radiates X-rays and an X-ray detection unit 20 which detects X-rays passing through an object 30 from among the X-rays radiated from the X-ray source 10 may be included. In an X-ray photographing apparatus 100 according to the present example embodiment, a plurality of X-ray sources 10 may be in an array-type arrangement. The array-type X-ray sources may be included in an X-ray generator 110. The X-ray sources in the X-ray generator 110 may be arrayed one- or two-dimensionally. Further, a plurality of X-ray detection units 20 also may be in an array-type arrangement. These X-ray detection units 20 may be included in an X-ray detector 120, which also can be arrayed one- or two-dimensionally.

Each of the plurality of X-ray sources 10 may generate X-rays while being driven independently. Accordingly, all the X-ray sources 10 may be driven to radiate X-rays to the object 30 or a part of X-ray sources 10 of the X-ray generator 110 may be driven to radiate X-rays to the object 30. At least one X-ray source 10 may be driven and radiate X-rays to all areas or a specific area of the object 30. Further, the two or more X-ray sources 10 may be configured to be driven simultaneously or sequentially. In this case, only the X-ray detection unit 20 corresponding to the driven one of the two or more X-ray sources 10 may be driven. Because an image is generated by using a signal output from each of the X-ray detection units 20, the X-ray detection unit 20 may also be referred to as a pixel. Thus, hereinafter, the terms 'X-ray detection unit 20' and 'pixel' will be used interchangeably.

The X-ray photographing apparatus 100 may further include a gantry 130 and an examination table 140. The gantry 130 includes an opening part 150 having a cylindrical shape such that the object 30 can be inserted into the opening 150. Also, the X-ray generator 110 which radiates X-rays and the X-ray detector 120 which detects X-rays passing through an object being examined may be placed inside the gantry 130. The X-ray generator 110 may be placed in a desired (or alternatively, predetermined) area at the circumference of the opening 150 of the gantry 130 to face the X-ray detector 120 with the object being placed at the center. For example, the X-ray generator 110 and the X-ray detector 120 are provided in the gantry in a structure where X-rays can be radiated perpendicularly.

Meanwhile, the gantry 130 may be rotated by a gantry driving unit (not shown) by 360° or a desired (or alternatively, predetermined) angle along the circumference of the object 30 so that photographing can be performed at a variety of angles by the X-ray generator 110 and the X-ray detector 120. Further, the gantry driving unit may move back and forth, for example, along the X-axis, to place the photographing area of the object 30 lying on the examination table 140 at the center of the inside of the gantry 130. The gantry driving unit may be provided inside or outside the gantry 130.

The examination table 140 may be provided in the form of a bed with a desired (or alternatively, predetermined) width so that a patient who is the object 30 can be laid and fixed thereon. An examination table driving unit (not shown), which move the examination table 140 to the opening 150 at the center of the gantry 130, may be provided at a desired (or alternatively, predetermined) area of the examination table 140. The examination table 140 can be driven horizontally back and forth by the examination table driving unit so that a photographing area of the patient can be placed at the center of the inside of the gantry 130. According to a body size of the patient or a photographing part, the driving unit of the examination table 140 may be configured to drive the examination table 140 upwards or downwards, for example, in the Z-axis direction, or to the left or right, for example, in the Y-axis direction so that a clear image can be obtained. FIG. 2 illustrates a computed tomography (CT) apparatus as the X-ray photographing apparatus 100. However, the X-ray photographing apparatus 100 is not limited thereto and can be applied to any photographing apparatuses having X-rays as a source.

Further, the X-ray photographing apparatus 100 may further include a signal processing unit which obtains an image by using the detection result of the X-ray detector 120, a display unit which displays the obtained image, and an input unit which receives a user command as an input. Those elements are well known and thus a detailed explanation thereof will be omitted.

Figure 3:
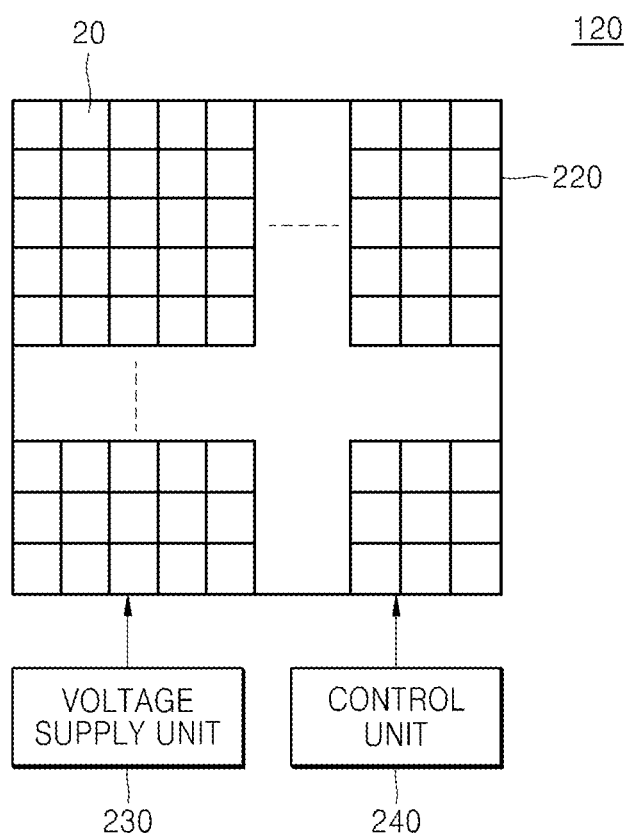
FIG. 3 is a schematic block diagram of an X-ray detector according to an example embodiment of the present invention.
Figure 4:
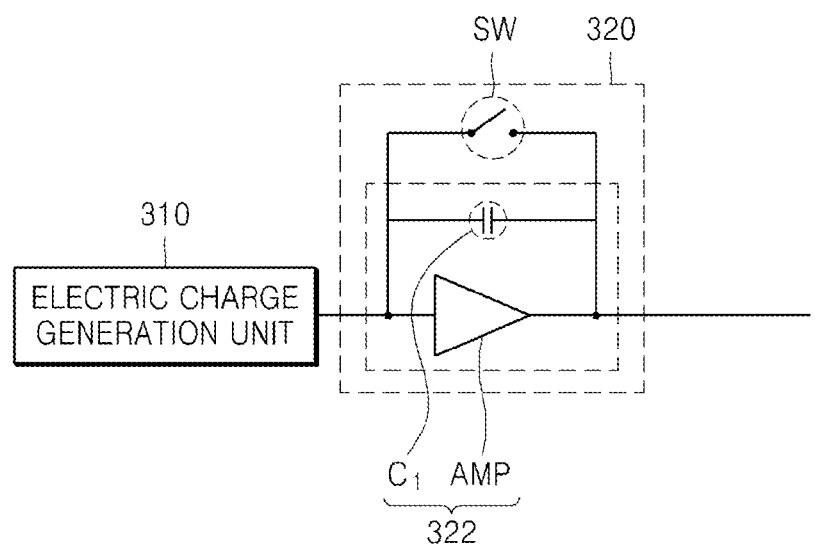
FIG. 4 is a schematic circuit diagram showing an X-ray detection unit in the X-ray detector of FIG. 3.

FIG. 3 is a schematic block diagram of an X-ray detector 120 according to an example embodiment of the present invention, and FIG. 4 is a circuit diagram showing an X-ray detection unit 20 in the X-ray detector 120 of FIG. 3. As shown in FIG. 3, the X-ray detector 120 may include a detection array 220, a voltage supply unit 230, and a control unit 240. A plurality of X-ray detection units 20 may be arranged in each of the detection array 220. The voltage supply unit 230 may supply a voltage in order for the X-ray detection unit 20 to detect X-rays. The control unit 240 may apply a control signal for operating or resetting the X-ray detection unit 20.

Further, as shown in FIG. 4, each of the X-ray detection units 20 may include an electric charge generation unit 310, which is configured to generate an electric charge when X-rays are incident, and an effective charge sensitive amplifier 320 which converts an effective charge among the electric charges generated in the electric charge generation unit 310 into a voltage.

When X-rays are incident, the electric charge generation unit 310 may directly convert the X-rays into an electric charge or may convert the X-rays into visible light rays and then, convert the visible light rays into an electric charge. When an electric charge is generated by the former method, the electric charge generation unit 310 may include a photoconductor. If an electric charge is generated by the latter method, the electric charge generation unit 310 may include a scintillator which converts X-rays into visible light rays and a photodiode which converts visible light rays into an electric charge. The electric charge generation unit 310 may employ both methods to generate an electric charge.

The effective charge sensitive amplifier 320 may amplify an electric charge which is used during X-ray imaging (hereinafter, referred to as "an effective charge") to output a voltage, and may remove an electric charge which is not used during the X-ray imaging (hereinafter, referred to as, "an electric charge being not effective"). The effective charge sensitive amplifier 320 may include a charge sensitive amplifier 322 which amplifies an electric charge to output a voltage, and a switching unit SW of which one end is connected to an input terminal of the charge sensitive amplifier 322 and the other end is connected to an output terminal of the charge sensitive amplifier 322. The charge sensitive amplifier 322 includes an amplifier unit AMP and a first capacitor C1, and one end of the first capacitor C1 is connected to the input terminal of the amplifier unit AMP and the other end is connected to the output terminal of the amplifier unit AMP.

When the switching unit SW is off, the electric charge applied from the electric charge generation unit 310 is stored in the first capacitor C1 and the stored electric charges are amplified by the amplifier unit AMP to be output as a voltage. When the switching unit SW is on, the electric charge applied from the electric charge generation unit 310 and stored in the capacitor C1 is discharged. That is, when the switching unit SW is turned on, the input terminal and output terminal of the amplifier unit AMP are short-circuited. Thus, the electric charge stored in the capacitor C1 can be discharged.

As described above, when the switching unit SW is turned off, a voltage corresponding to the electric charge is output and when the switching unit SW is turned on, the electric charge is discharged and thus the effective charge sensitive amplifier 320 can selectively output the electric charge used in an imaging operation. Further, by discharging the electric charge, the effective charge sensitive amplifier 320 can be initialized. Accordingly, the state in which the switching unit SW is off may be referred to as an reset mode of the effective charge sensitive amplifier 320 and the state in which the switching unit SW is on may be referred to as an operation mode of the effective charge sensitive amplifier 320.

In FIG. 4, although one effective charge sensitive amplifier 320 is connected to one charge generation unit 310, example embodiments are not limited thereto. For example, a plurality of electric charge generation units 310 may be connected to one effective charge sensitive amplifier 320. When the effective charge sensitive amplifier 320 is in an operation mode, electric charges from the plurality of electric charge generation units 310 may be received sequentially to output a voltage. However, when the effective charge sensitive amplifier 320 is in a reset mode, electric charges from the plurality of electric charge generation units 310 may be sequentially received to be discharged or may be simultaneously received to be discharged.

Figure 5:
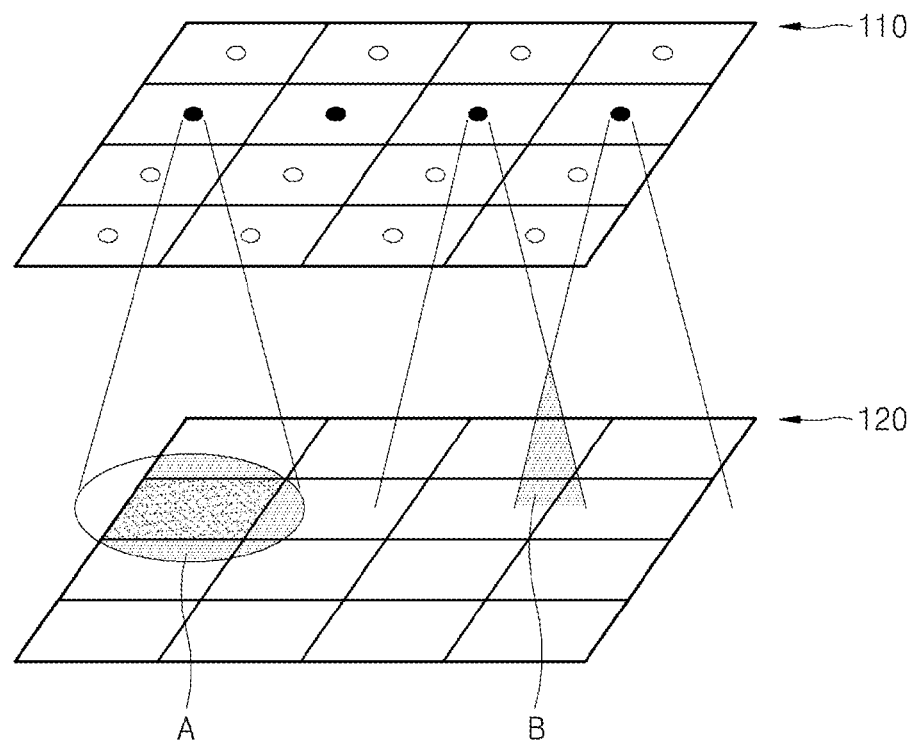
FIG. 5 is a diagram showing an array-type X-ray generator and an X-ray detector according to an example embodiment of the present invention.

FIG. 5 is a diagram showing an array-type X-ray generator and an X-ray detector according to an example embodiment of the present invention. As shown in FIG. 5, an X-ray generator 110 may include a plurality of X-ray sources 10 arranged two-dimensionally, and an X-ray detector 120 may also include a plurality of X-ray detection units 20 arranged two-dimensionally. X-rays radiated by an X-ray source 10 are generally spread. Accordingly, X-rays can be radiated to an area A, which includes the corresponding X-ray detection unit 20 and some of the X-ray detection units 20 other than the corresponding X-ray detection unit 20. Thus, when the plurality of X-ray sources 10 radiate X-rays, some X-rays may overlap and interfere with each other in an area B. As a result, exposure of the object to X-rays may be too great and an X-ray image resulted thereby may include noise.

Therefore, in an X-ray photographing apparatus according to at least one example embodiment of the present embodiment, some X-ray sources 10 radiate X-rays and X-ray detection units 10 corresponding to the some X-ray sources 10 are configured to operate to detect the radiated X-rays, thereby reducing exposure to X-rays. Further, noise of the X-ray photographing apparatus can be reduced by resetting the X-ray detection units 20 which are not in operation.

Figure 6:
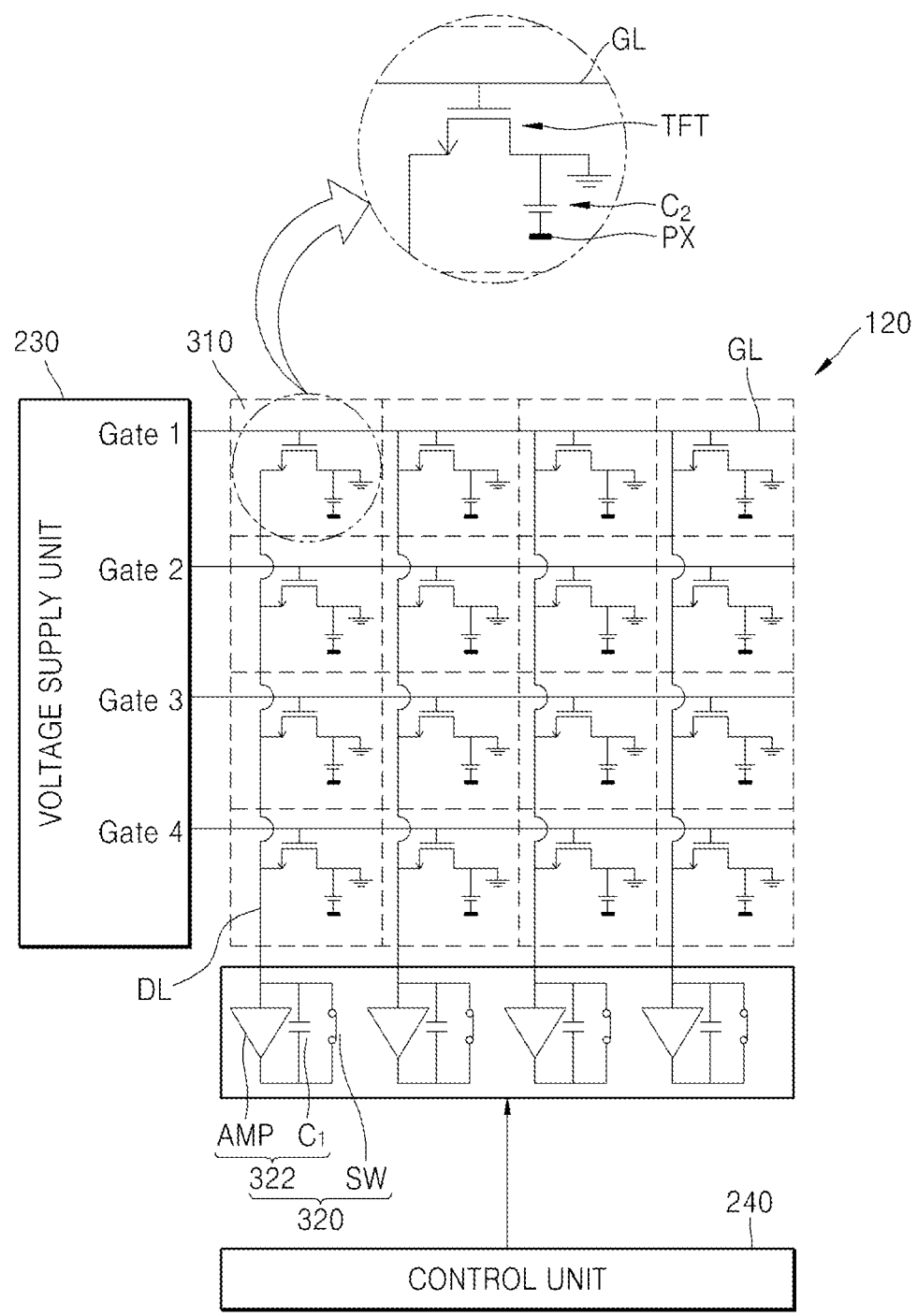
FIG. 6 is a circuit diagram showing an X-ray detector according to an example embodiment of the present invention.
Figure 7A:
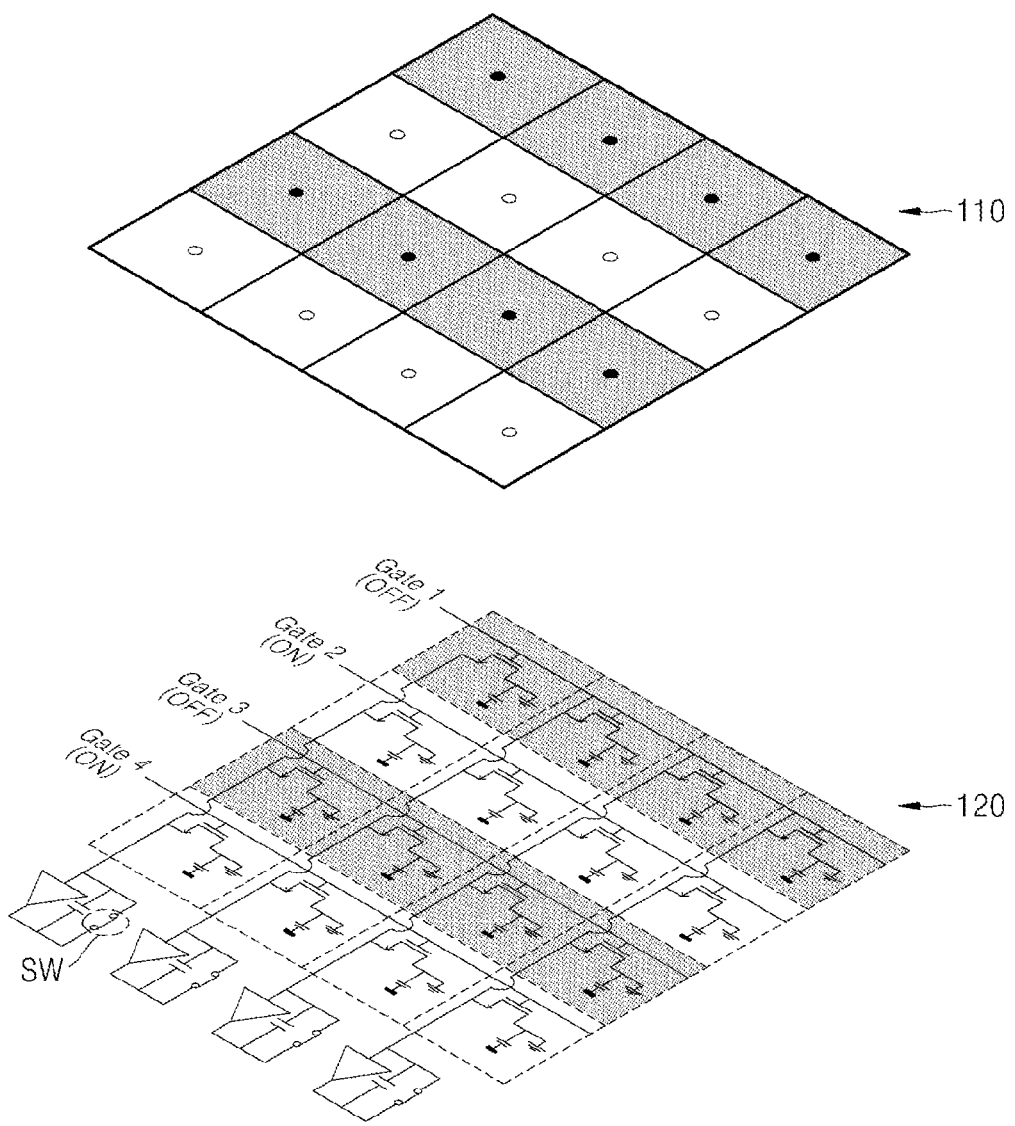
FIGS. 7A and 7B are diagrams illustrating operations of the X-ray detector of FIG. 6.
Figure 7B:
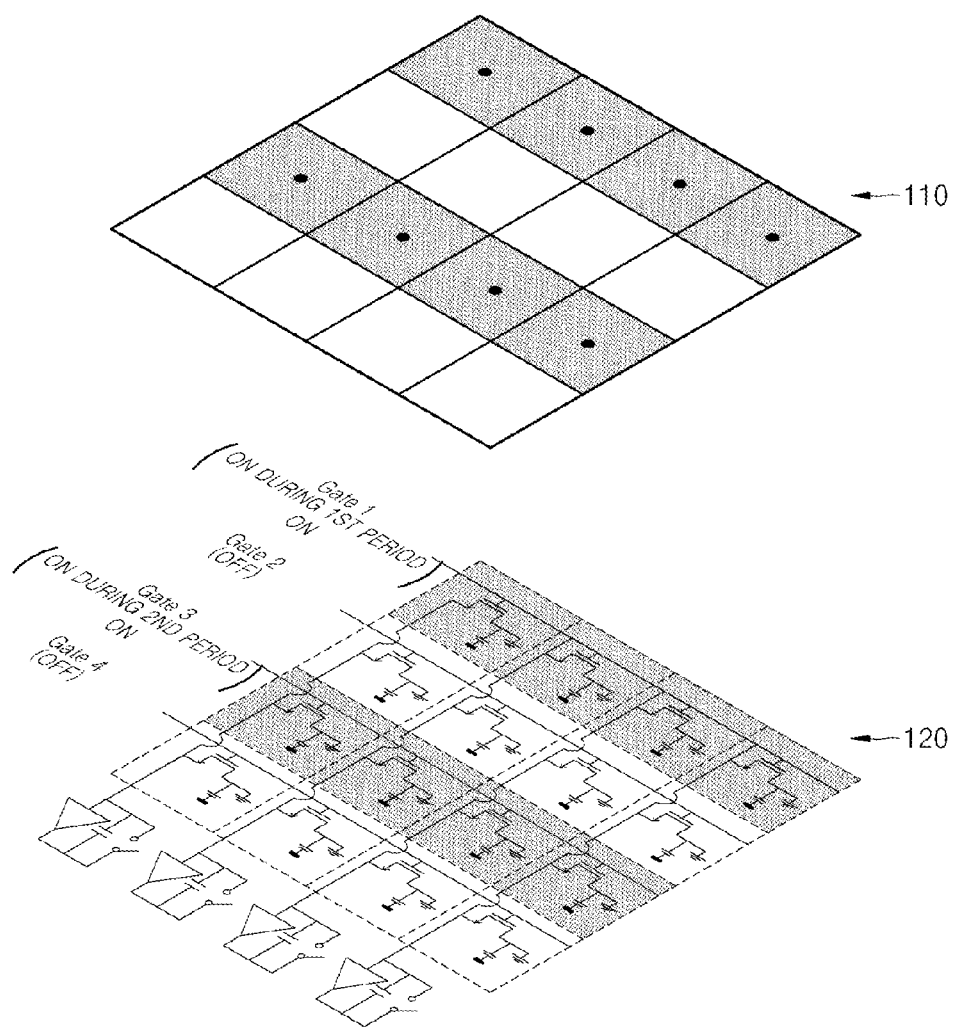

FIG. 6 is a circuit diagram showing an X-ray detector 120 according to an example embodiment of the present invention, and FIGS. 7A and 7B are diagrams illustrating operation of the X-ray detector 120 of FIG. 6. As shown in FIG. 6, the X-ray detector 120 may include a plurality of electric charge generation units 310 arranged two-dimensionally. Each electric charge generation unit 310 includes a second capacitor C2, of which one end is connected to a pixel electrode PX and the other end is connected to one electrode (e.g., a source electrode) of a transistor TFT. The gate electrode of each TFT transistor arranged in an identical row may be connected to a voltage supply unit 230 through a gate line GL. Another electrode (e.g., a drain electrode) of the TFT transistor may be connected to an effective charge sensitive amplifier 320 through a data line DL. Electrodes of TFT transistors arranged in an identical column may be connected to a same effective charge sensitive amplifier 320.

X-ray sources 10 arranged in odd columns may radiate X-rays. While the X-ray sources 10 arranged in odd columns radiate X-rays, as shown in FIG. 7A, the gate voltage of the TFT transistors arranged in odd columns may be configured to turn off the corresponding TFT transistors and the gate voltage of the TFT transistors arranged in even columns may be configured to turn on" the corresponding TFT transistors. The effective charge sensitive amplifiers 320 may be set to a reset mode by a control unit 240.

As the gate voltage of the TFT transistors arranged in odd columns is configured to turn off the corresponding TFT transistors, an electric charge generated in the electric charge generation units 310 of the odd columns is stored in the second capacitor C2. Further, as the gate voltage of the TFT transistors arranged in even columns is configured to turn on the corresponding TFT transistors, an electric charge generated in the electric charge generation units 310 of even columns may be applied to the effective charge sensitive amplifier 320 through the data line DL. When the effective charge sensitive amplifier 320 is in a reset mode (e.g., when the switching unit SW is on), electric charges applied to the effective charge sensitive amplifier 320 can be discharged. Because the electric charge generated in the electric charge generation units 310 of even columns, which tends to cause noise in an X-ray image, is discharged through the effective charge sensitive amplifier 320, the noise in the resultant X-ray image can be minimized or removed.

Then, as shown in FIG. 7B, the gate voltage of the TFT transistors arranged in odd columns may be sequentially turned on one by one and the effective charge sensitive amplifier 320 may be set to an operation mode by the control unit 240. For example, the gate voltage of the TFT transistors arranged in a first column may be set to turn on the corresponding TFT transistors during a first period. Then, the electric charge stored in the second capacitor C2 of the first column is applied to the effective charge sensitive amplifier 320 through the data line DL. When the effective charge sensitive amplifier 320 is in an operation mode (e.g., when the switching unit SW is off), the effective charge sensitive amplifier 320 can output the applied electric charge as a voltage. Then, during a second period, the gate voltage of the first column may be set to turn off the corresponding TFT transistors and the gate voltage of the third column may be set to turn on the corresponding TFT transistors. Then, the electric charge stored in the second capacitor C2 of the third column is applied to the effective charge sensitive amplifier 320 through the data line DL. When the effective charge sensitive amplifier 320 is in an operation mode (when the switching unit SW is off), the effective charge sensitive amplifier 320 can output the applied electric charge as a voltage.

As described so far, some X-ray detection units corresponding to some X-ray sources radiating X-rays may be configured to output a voltage and the rest of the X-ray detection units receiving the irradiated X-rays may be configured to reduce or remove the generated electric charge. Thus, noise of a photographing apparatus can be reduced or prevented. Further, because some (e.g., not all) X-ray sources and corresponding X-ray detection units may be configured to operate, the amount of X-ray exposure of the photographing apparatus can be reduced.

Figure 8:
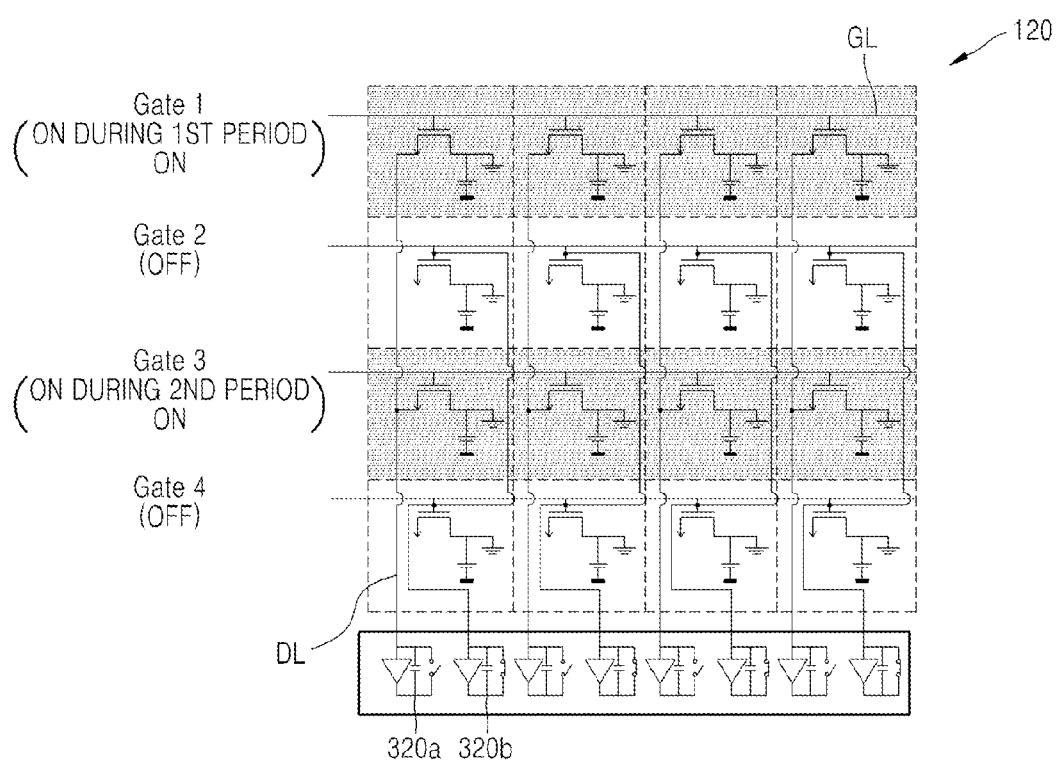
FIG. 8 is an X-ray detector according to another example embodiment of the present invention.

FIG. 8 is an X-ray detector 120 according to another example embodiment of the present invention. As shown in FIG. 8, an X-ray detector 120 may include a plurality of electric charge generation units 310 arranged two-dimensionally. Each electric charge generation unit 310 includes a second capacitor C2, in which one end is connected to a pixel electrode PX, and the other end is connected to one electrode (e.g., a source electrode) of a TFT transistor. The gate electrode of each TFT transistor arranged in an identical row may be connected to a same voltage supply unit 230 through a gate line GL. Another electrode (e.g., a drain electrode) of the TFT transistor may be connected to an effective charge sensitive amplifier 320 through a data line DL. Electrodes of the TFT transistors arranged in an identical column may be connected to, for example, one effective charge sensitive amplifier 320. The drain electrode of each TFT transistor arranged in odd columns may be connected to a first effective charge sensitive amplifier 320a and the drain electrode of each TFT transistor arranged in even columns may be connected to a second effective charge sensitive amplifier 320b. When the first effective charge sensitive amplifier 320a is in an operation mode, the second effective charge sensitive amplifier 320b is in a reset mode, and when the first effective charge sensitive amplifier 320a is in a reset mode, the second effective charge sensitive amplifier 320b may operate in an operation mode. By using the first and second effective charge sensitive amplifiers 320a and 320b, the speed of X-ray detection may be enhanced.

Referring to FIGS. 6 and 8, the methods of detecting X-rays performed by the X-ray detector when X-ray sources radiate X-rays in units of lines has been explained. However, X-rays may be radiated in units of X-ray sources. In this case, some X-ray detectors corresponding to the X-ray sources radiating the X-rays may output a voltage and the rest of the X-ray detectors may discharge generated electric charges.

Figure 9:
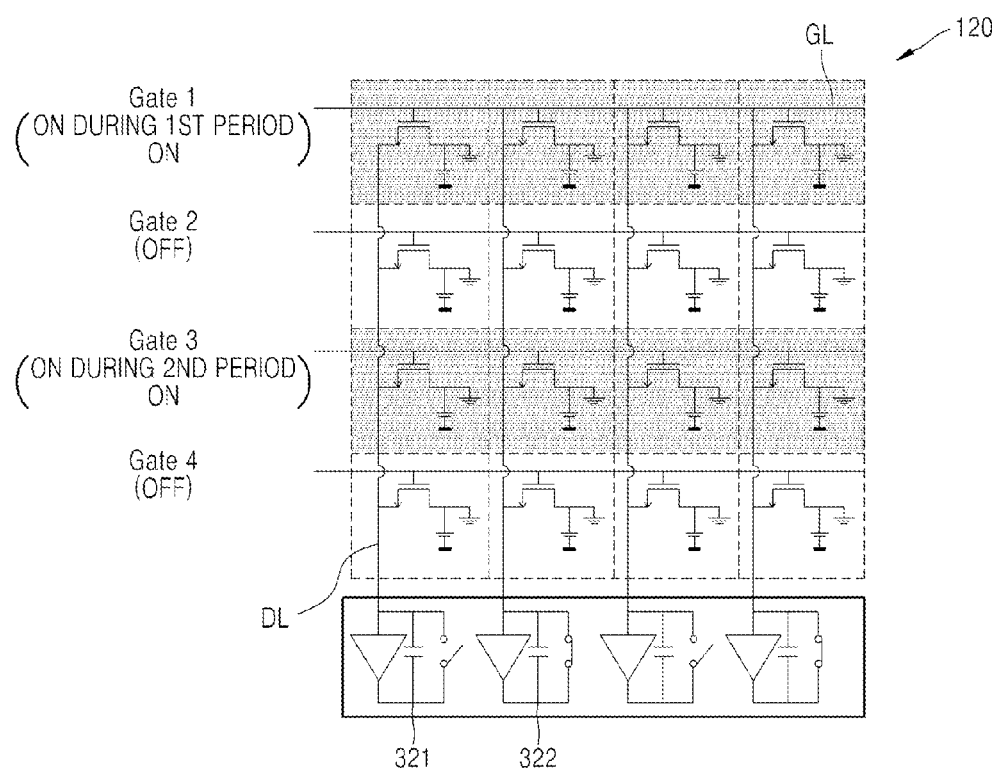
FIG. 9 is a diagram illustrating an operation when X-ray detectors at odd columns and odd rows detect X-rays according to an example embodiment of the present invention.

FIG. 9 is a diagram illustrating an operation when X-ray detectors at odd columns and odd rows detect X-rays according to an example embodiment of the present invention. Removal of an electric charge generated in the electric charge generation units 310 arranged in even columns is the same as shown in FIG. 7A, and therefore an explanation thereof will be omitted here. When electric charges generated in an electric charge generation units 310 arranged in odd rows and odd columns are output as a voltage (e.g., by configured corresponding effective charge sensitive amplifiers 321 to be in an operation mode), electric charges generated in the electric charge generation units 310 arranged in odd rows and even columns may be removed. By setting the effective charge sensitive amplifiers 322 in even rows to a reset mode, the electric charges generated in the X-ray detector 120 can be discharged.

Thus, some effective charge sensitive amplifier of the corresponding X-ray detection unit may be configured to operate in an operation mode and the other effective charge sensitive amplifiers may be configured to operate in a reset mode at a given time.

Figure 10:
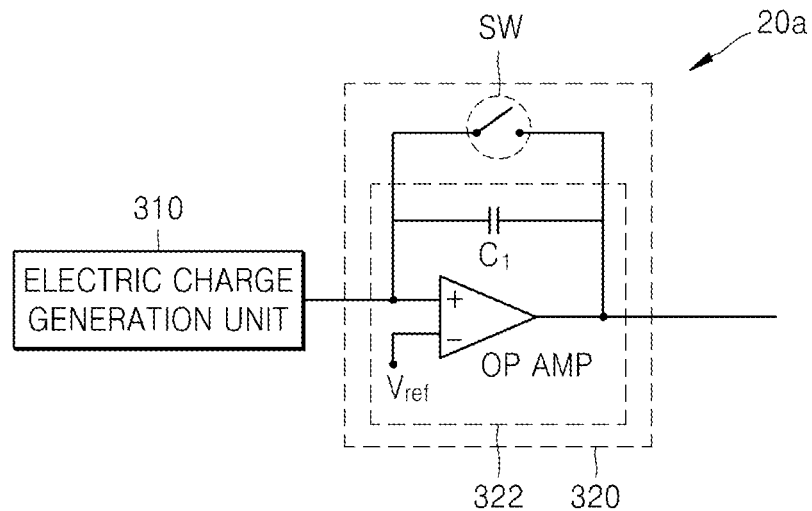
FIG. 10 is an example of an X-ray detection unit of FIG. 3 according to an example embodiment of the present invention.

FIG. 10 is an example of an X-ray detection unit of FIG. 3 according to an example embodiment of the present invention. As shown in FIG. 10, the amplifier unit in the X-ray detection unit 20a may be implemented by an operational amplifier OP AMP. The input terminal of the operation amplifier OP AMP may include an inverted input terminal (−), to which a reference voltage Vref1 is applied, and a non-inverted input terminal (+), and the amplifier unit may output a voltage by amplifying the voltage difference between the inverted input terminal (−) and the non-inverted input terminal (+).

Figure 11:
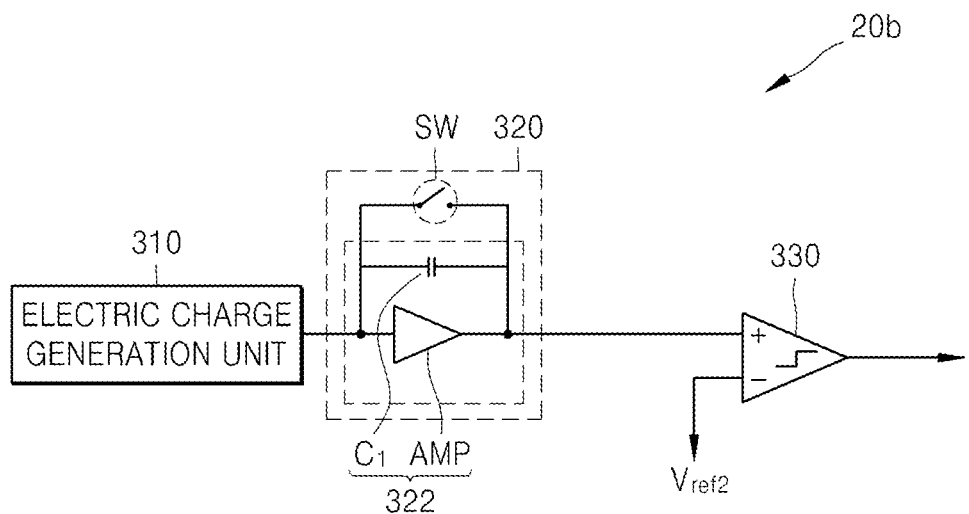
FIGS. 11 and 12 are examples of X-ray detection units according to an example embodiment of the present invention.
Figure 12:
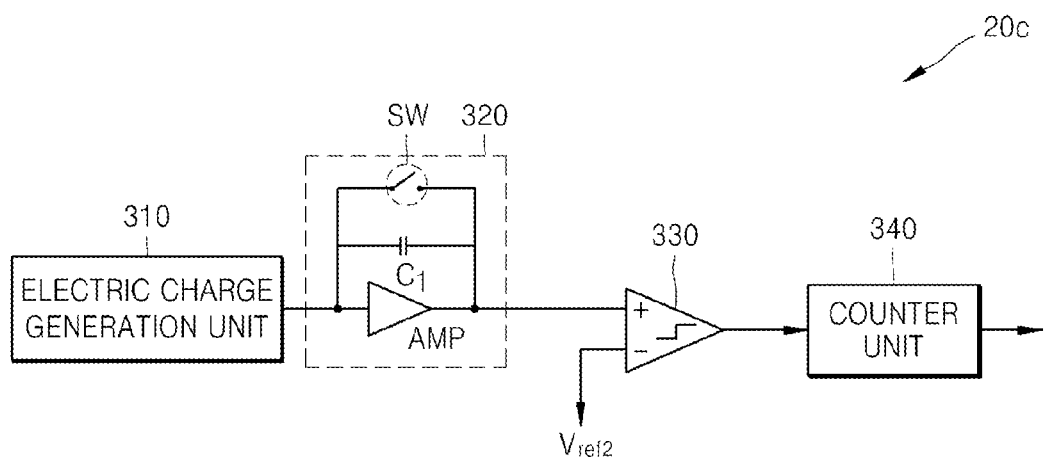

FIGS. 11 and 12 are examples of X-ray detection units according to an example embodiment of the present invention. Compared to FIG. 3, the X-ray detection unit 20b of FIG. 11 may further include a comparator 330. To the (+) terminal of the comparator 330, an output voltage amplified in an effective charge sensitive amplifier 320 is applied. To the (−) terminal of the comparator 330, a reference voltage Vref2 is applied. The comparator 330 may compare the output voltage of the effective charge sensitive amplifier 320 with the reference voltage Vref2 and may output a pulse signal having a pulse width from a time when the output voltage becomes greater than the reference voltage Vref2 to a time when the output voltage becomes less than the reference voltage Vref2.

The X-ray detection unit may further include a counter unit 230 as shown in FIG. 12, in a photo-counting method. The counter unit 340 counts the pulse signals output from the comparator 330. Whenever a photon which is equivalent to X-rays is incident, a pulse signal is output. Therefore, the amount of energy of incident X-rays in the corresponding electric charge generation unit in unit time is proportional to the number of pulsing times of pulse signal. The counter unit 340 may be implemented by, for example, a linear feedback shift register or binary counter.

X-ray photographing methods and/or apparatuses according to example embodiments can reduce a risk of radiation overdose by driving some X-ray sources and some X-ray detectors corresponding to the driven X-ray sources. Also, electric charges generated in some X-ray detectors other than X-ray detectors corresponding to the X-ray sources may be removed, and thus interference of X-rays can be reduced or prevented.

While method of detecting X-rays, X-ray photographing method using the detected X-rays, and an X-ray detector using the methods according to example embodiments of the present invention have been particularly shown and described with reference to drawings of some example embodiments, it should be understood that the example embodiments described herein should be considered in a descriptive sense only and not for purposes of limitation. While some example embodiments of the present invention have been described with reference to the figures, it will be understood by those of ordinary skill in the art that various changes in form and details may be made therein without departing from the spirit and scope of example embodiments as defined by the following claims.

What is claimed is:

1. A method of detecting X-rays, the method comprising:
   radiating a first X-ray;
   removing, from a first X-ray detection unit, a first electric charge generated by the radiated first X-ray; and
   outputting, by a second X-ray detection unit adjacent to the first X-ray detection unit, a voltage corresponding to the radiated first X-ray.

2. The method of claim 1, wherein the outputting comprises:
   generating a second electric charge by the radiated first X-ray; and
   outputting the voltage corresponding to the second electric charge.

3. The method of claim 1, wherein removing comprises discharging the first electric charge.

4. The method of claim 1, wherein removing is performed while radiating the radiated first X-ray.

5. The method of claim 1, further comprising:
   radiating a second X-ray;
   removing, by the second X-ray detection unit, a third electric charge generated by the second X-ray; and
   outputting, by the first X-ray detection unit, a voltage corresponding to the second X-ray.

6. The method of claim 1, wherein the second X-ray detection unit responds to the first X-ray radiated by an X-ray source.

7. An X-ray photographing method comprising:
   radiating, by an X-ray source, X-rays;
   outputting, by an X-ray detection unit corresponding to the X-ray source, a voltage corresponding to X-rays incident on the X-ray detection unit corresponding to the X-ray source;
   stopping the radiation of X-rays from the X-ray source; and
   removing, from the X-ray detection unit, a generated first electric charge through a charge sensitive amplifier.

8. The method of claim 7, wherein the first electric charge is generated by an X-ray incident on at least one X-ray detection unit other than the X-ray detection units corresponding to the X-ray source radiating the X-rays.

9. The method of claim 7, wherein outputting comprises: generating a second electric charge corresponding to the X-rays incident on the X-ray detection unit corresponding to the X-ray source; and outputting the voltage corresponding to the second electric charge.

10. The method of claim 7, wherein the removing comprises discharging the first electric charge.

11. An X-ray detector comprising:
    a first electric charge generation unit configured to generate an electric charge in response to incident X-rays; and
    a first effective charge sensitive amplifier configured to selectively output a voltage corresponding to the electric charge and remove the electric charge.

12. The X-ray detector of claim 11, wherein,
    when an X-ray source corresponding to the first electric charge generation unit radiates the X-rays, the first effective charge sensitive amplifier is configured to output the voltage corresponding to the electric charge, and
    when the X-ray source stops radiating the X-rays, the first effective charge sensitive amplifier is configured to remove the electric charge.

13. The X-ray detector of claim 11, wherein the first effective charge sensitive amplifier comprises:
    a charge sensitive amplifier configured to output the voltage corresponding to the electric charge; and
    a first switching unit, one end of which being connected to an input terminal of the charge sensitive amplifier and the other end of which being connected to an output terminal of the charge sensitive amplifier.

14. The X-ray detector of claim 13, wherein,
    when the first switching unit is turned off, the first effective charge sensitive amplifier is configured to output the voltage corresponding to the electric charge; and
    when the first switching unit is turned on, the first effective charge sensitive amplifier is configured to remove the electric charge.

15. The X-ray detector of claim 11, wherein the first effective charge sensitive amplifier includes an effective charge sensitive amplifier configured to remove the electric charge by discharging the electric charge.

16. The X-ray detector of claim 11, further comprising:
    a second electric charge generation unit adjacent to the first electric charge generation unit, the second electric charge generation unit configured to generate an electric charge in response to incident X-rays;
    a first transistor configured to apply the electric charge generated in the first electric charge generation unit to the first effective charge sensitive amplifier; and
    a second transistor configured to apply the electric charge generated in the second electric charge generation unit to the first effective charge sensitive amplifier.

17. The X-ray detector of claim 16, wherein, when any one of the first and second transistors is turned on, the other is configured to be turned off.

18. The X-ray detector of claim 16, wherein,
    when an X-ray source corresponding to the first electric charge generation unit radiates the X-rays and the first transistor is turned on, the first effective charge sensitive amplifier is configured to output a voltage corresponding to the electric charge provided from the first electric charge generation unit, and
    when the X-ray source corresponding to the first electric charge generation unit radiates the X-rays and the second transistor is turned on, the first effective charge sensitive amplifier is configured to remove the electric charge provided from the second electric charge generation unit.

19. The X-ray detector of claim 16, further comprising:
    a second effective charge sensitive amplifier configured to output a voltage corresponding to the electric charge or remove the electric charge, wherein the second transistor is configured to apply the electric charge to the second effective charge sensitive amplifier.

20. The X-ray detector of claim 19, wherein when the second effective charge sensitive amplifier is in an operation mode, the first effective charge sensitive amplifier is configured to be in a reset mode.

* * * * *